Dec. 22, 1942.    J. W. LEIGHTON    2,305,880
OSCILLATORY CONNECTION
Filed Feb. 3, 1941    2 Sheets-Sheet 1
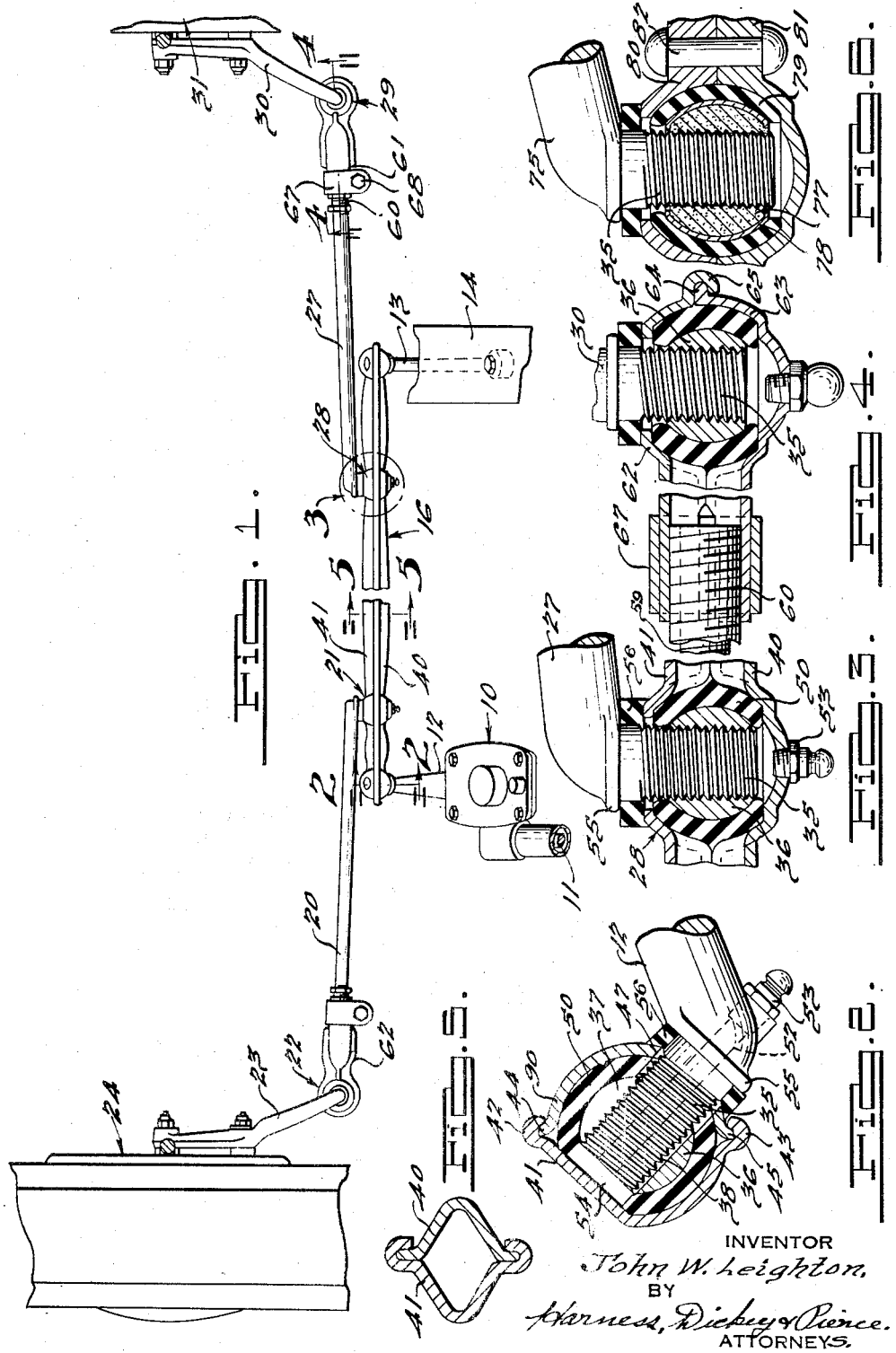
INVENTOR
John W. Leighton,
BY
Harness, Dickey & Pierce.
ATTORNEYS.

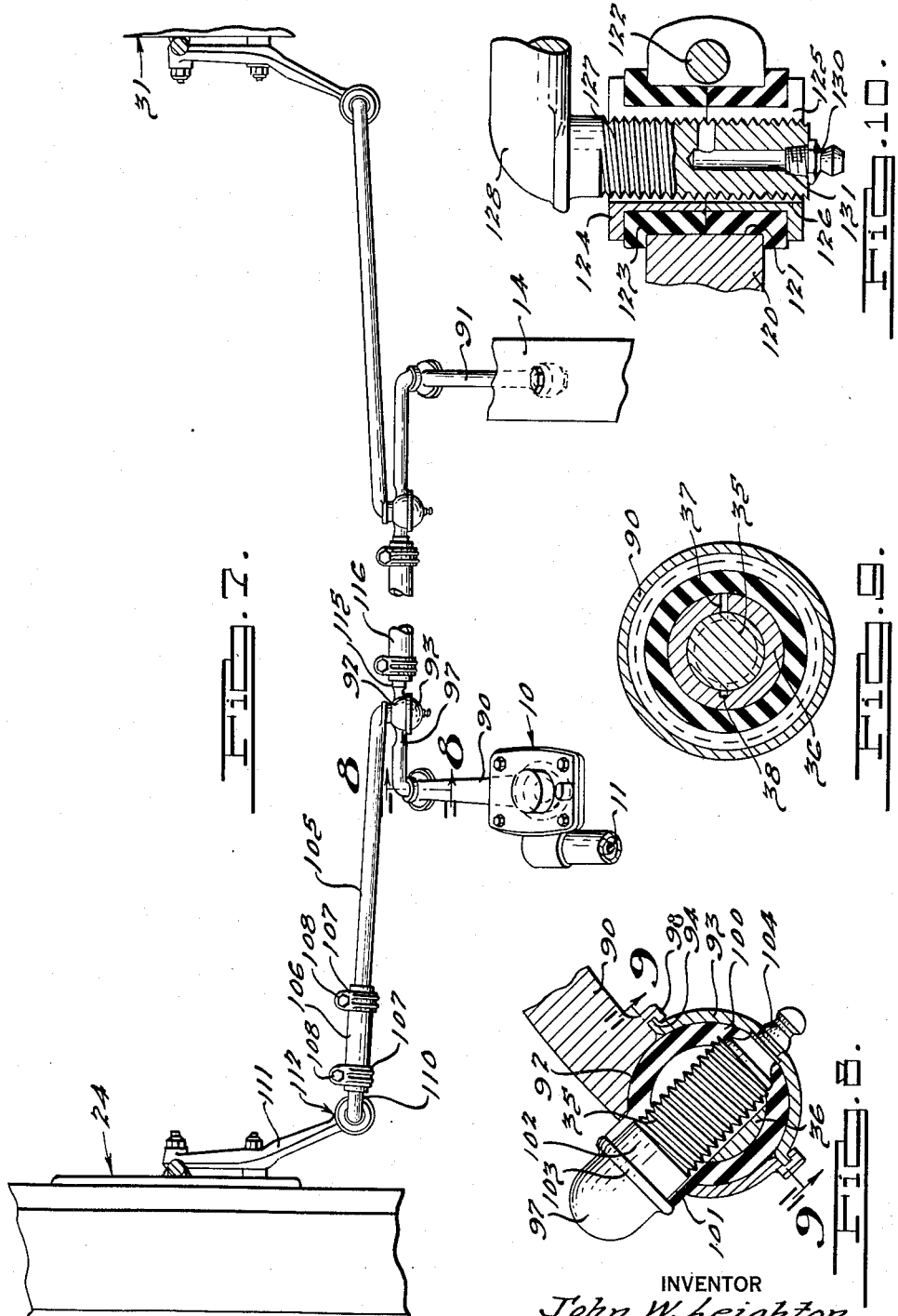

Patented Dec. 22, 1942

2,305,880

UNITED STATES PATENT OFFICE 2,305,880

OSCILLATORY CONNECTION

John W. Leighton, Port Huron, Mich.

Application February 3, 1941, Serial No. 377,169

12 Claims. (Cl. 287—85)

The invention relates generally to automobiles and it has particular relation to oscillatory connections adapted to connect oscillatory parts in a steering gear.

With respect to steering gears for motor vehicles, it will be appreciated that various relative movements of the links and other parts are required. Certain movements are required when the wheels are turned during steering. Other movements are effected by up-and-down movement of the wheels relative to each other and relative to the frame during movement of the vehicle. Moreover, in the upward and downward movement of the wheels, they may tilt laterally or move laterally due to the pivotal linkages embodied in wheel suspension. All of the movements are necessarily compounded most of the time since upward and downward movement of the wheels is usually occurring during steering manipulation.

One object of the present invention is to provide an improved steering gear and improved connections therein for permitting the different oscillatory movements required in an efficient, quiet, and easy manner.

Another object of the invention is to provide an improved oscillatory connection for steering gears or the like which embodies a threaded bearing and means for constantly compensating for wear or looseness in the threads, so as to thereby avoid noise and play.

Another object of the invention is to provide an improved oscillatory connection which involves a resilient or cushioning means for eliminating vibrations.

Another object of the invention is to provide an improved oscillatory connection embodying a threaded bearing which permits the necessary movements required in a steering gear or similar linkage.

Another object of the invention is to provide an improved steering gear embodying links fabricated from sheet metal stampings, to the end that an efficient, inexpensive, and strong arrangement may be obtained.

Other objects of the invention will become apparent from the following specification, the drawings relating thereto, and from the claims hereinafter set forth:

For a better understanding of the invention, reference may be had to the drawings wherein:

Figure 1 is a plan view of a steering gear embodying one form of the invention;

Fig. 2 is a cross-sectional view on a larger scale taken substantially along the line 2—2 of Fig. 1;

Fig. 3 is a cross-sectional view on a larger scale taken substantially along a horizontal plane indicated at 3 in Fig. 1;

Fig. 4 is a cross-sectional view on a larger scale taken substantially along the line 4—4 of Fig. 1;

Fig. 5 is a cross-sectional view on a larger scale taken substantially along the line 5—5 of Fig. 1;

Fig. 6 illustrates an oscillatory connection in cross-section as constructed according to another form of the invention;

Fig. 7 is a view on the order of Fig. 1 illustrating a steering gear constructed according to another form of the invention;

Fig. 8 is a cross-sectional view on a larger scale taken substantially along the line 8—8 of Fig. 7;

Fig. 9 is a cross-sectional view taken substantially along the line 9—9 of Fig. 8;

Fig. 10 is a cross-sectional view illustrating an oscillatory connection constructed according to another form of the invention.

Referring to Fig. 1, the steering mechanism is indicated generally at 10 and includes a turnable post or shaft 11 which is operated by moving the steering wheel and operation of this, in turn, moves a crank arm 12. The box or mechanism 10 is mounted on the frame of the vehicle so that the crank arm 12 projects downwardly and forwardly and at the laterally opposite side of the center line of the vehicle, a second crank arm 13 depends from a frame member 14. A link 16 is movably connected at its ends to the forward ends of the arms 12 and 13 so that when the crank arm 12 is moved, the link 16 will be shifted laterally through parallel positions.

A tie rod 20 is pivotally connected to the link 16 at a point adjacent the crank arm 12 as indicated at 21 and at its opposite end the tie rod is connected as indicated at 22 to an arm 23 rigid with the wheel 24. Similarly, a tie rod 27 is pivotally connected as indicated at 28 to the link 16 adjacent the arm 13 and this tie rod in turn at its other end is pivotally connected as indicated at 29 to an arm 30 on the right wheel indicated at 31.

Referring to Fig. 2, the crank arm 12 terminates in a threaded trunnion 35, which projects into and has threaded bearing engagement with a bushing 36 having a frusto spherical exterior surface. This bushing is longitudinally split at one point as indicated at 37 and diametrically opposite to the split, the wall has an axially extending groove 38 so that the wall of the bushing opposite to the split is thinner than it is at other points. In other words, in forming the split 37, the cuts extend through one wall and then partly into the wall at the diametrically opposite point. The split permits contraction of the bushing about the trunnion 35 and the groove 38 reduces resistance to contraction since it will be appreciated that the wall of the bushing at the location of the groove 38 serves as a hinge point. Fig. 9 more particularly shows the arrangement of the split 37 and groove 38.

As shown by Figure 2, the link 16 is formed from sheet metal stampings indicated at 40 and 41 and it will be noted that the stamping 41 has its edges 42 and 43 folded around outwardly turned edges 44 and 45 of the stamping 40. Thus, the two stampings have their edges interlocked rigidly.

The trunnion 35 projects into the stampings 40 through a slightly larger opening 47 and at the point where the trunnion so projects into the stamping, both stampings are shaped to provide a substantially spherical socket. This socket is substantially larger than the bushing 36 and between the bushing and the interior wall of the socket, a resilient rubber bushing 50 is provided. Preferably, this bushing is constructed of synthetic rubber, such as neoprene and has oil or lubricant resisting qualities.

The stampings are so interlocked during assembly that the rubber 50 is placed under compression, from which it follows that the rubber constantly acts to contract the bushing about the trunnions. Hence, any looseness is taken up by contraction of the bushing and as wear on the thread occurs, the bushing gradually contracts to compensate for the wear. The rubber not only provides a cushion to counteract vibration and a means for contracting the bushing about the trunnion, but it also serves to permit a certain amount of movement of the trunnion and link relatively in directions longitudinally and transversely of the link. Pivotal movement of the trunnions and bushings is permitted by the threaded bearings and it will be understood that the contracting tendency of the bushings is not such as to prevent a free and easy oscillatory movement between the bushing and the trunnion.

Lubricant may be injected into the threaded bearing by means of a passageway 52 in the trunnion which extends to the exterior of the arm 12 where a grease fitting 53 is provided. The passageway at the inner end of the trunnion communicates with a space 54 and from this space the lubricant may pass longitudinally through the slit and groove and also between the threads.

A rubber sealing ring 56 may be employed around the base of the trunnion 35 in sealing engagement with the outer surface of the stamping 40 and this sealing ring may be retained by a collar 55 on the arm 12. Thus, lubricant will be prevented from escaping.

The connection between the crank arm 13 and the opposite end of the link 16 is identical to the connection shown in Fig. 2.

Each of the tie rods 20 and 27 is connected to the link 16 in the manner shown by Fig. 3 and the connection is substantially identical to the connection shown by Fig. 2. It may be observed, however, that the trunnion projects at substantially right angles to the tie rod, that the grease fitting extends through the side wall of the stamping 40 instead of to the trunnion, and that the socket is formed with a slightly different shape.

Referring to Figs. 1 and 4, the tie rod 27 terminates at its outer end in a threaded end 59 and this end receives an internally threaded bushing 60. The bushing 60 is also externally threaded and has threaded engagement with an internally threaded tubular portion 61 of a stamping formed from two pieces of sheet metal 62 and 63 having interlocking edges 64 and 65. The threads on the exterior of the bushing 60 and on the interior of the tubular part 61 are opposite in direction to the threads on the interior of the bushing and on the exterior of the tie rod 27 so that upon turning the bushing 60, the effective length of the tie rod may be varied. In order to clamp the parts in adjusted relation, the edges of the tubular portion 61 adjacent the end are not formed with the interlocking flanges 64 and 65 and are slightly separated so that such portion may be contracted about the bushing 60. Then, by means of a clamp 67 and clamping bolt 68, the tubular part 61 may be positively contracted into binding engagement with the bushing so that relative turning of the bushing and stamping will be prevented.

At the opposite end, the two parts 62 and 63 are shaped to provide a spherical socket for receiving a threaded trunnion on the wheel arm 30. The pivotal connection provided in Fig. 4 is substantially identical in all other respects to those described in connection with Figs. 2 and 3.

With respect to the stampings, it is to be understood that two sheets of metal are formed to provide partly spherical sockets and that the parts are brought together so that a completely annular or spherical socket is obtained. It also is to be noted that expansion of the rubber is restricted and when placed in a state of compression during assembly, the rubber constantly will act to contract the metal bushing.

Referring to Fig. 6, a connection is illustrated which might be employed at any of the pivotal points shown in Fig. 1. In this instance, an arm 75 is illustrated and is provided with a trunnion which projects into a bearing 77 formed from compressed, lubricant impregnated fibrous material rigidly compressed into shape. The material in the bearing is retained by a metal shell 78 and this is surrounded by a rubber bushing 79 retained in a spherical socket generally on the order of those already described. As shown, sheet metal stamping members are not provided although they could be used. In place of stampings, forged members 80 and 81 are employed and these are connected by means of rivets 82 at opposite sides of the socket. In a construction of this character, the bearing material 77 may be formed without threads and then the trunnion may be threaded therethrough so that a close threaded bearing fit will be provided. Due to the lubricant present in the material, this threaded bearing will be constantly lubricated. The rubber bushing in this case will not contract the bearing but will serve as a cushioning element and also to allow pivotal movement in directions transversely and longitudinally of the socket.

In general, it is to be noted in connection with Fig. 1 in conjunction with the cross-sectional view shown, that the principal oscillatory or pivotal movement is allowed through the threaded pivotal bearings, or, in other words, the axes of the bushings and trunnions are so arranged as to take care of the principal or major pivotal movements. Any other movements required will be taken care of through the rubber without undesirable distortion. The rubber being in a state of compression and being restricted in its movements, it will be apparent that resilient movement will not be too great and that generally the rubber will act as a sufficiently solid thrust member.

In the construction shown by Figs. 7, 8, and 9, a similar steering gear arrangement is provided, but the parts are constructed differently from that shown by Fig. 1. In this case arms 90 and 91 are provided in place of the arms 12 and 13, and each of these arms, as shown by Fig. 8, comprises a forging shaped to provide part of a spherical socket 92. A stamping 93 completes the socket and the edges of this stamping, indicated at 94, are interlocked with a peened over flange 96 of the forging 90. An intermediate link, indicated at 97, is formed from a rod and terminates at its left end in a threaded trunnion which projects into the socket 92 opposite the stamping 93 and into a bushing 36 of the character previously described. A similar rubber member 100 encases the bushing 36 and in this instance the rubber member has a tubular extension 101 projecting out of the socket and around a shoulder 102 on the trunnion exterior to the socket. A collar 103 abuts the end of the tubular part of the rubber bushing. Grease may be injected into the threaded bearing by means of a grease fitting 104 fastened in the stamping 93 beyond the end of the threaded trunnion 35.

At its right end, the rod 97 is shaped to provide a socket part corresponding to that indicated at 92 in Fig. 8 and a similar sheet metal stamping 93 completes the socket. This socket receives a threaded trunnion on the right end of a tie rod 105 which at its left end is adjustably threaded into a slotted tubular sleeve 106 and locked in adjusted position by a clamp 107 and clamping bolt 108. The left end of the sleeve 106 has similar, adjustably threaded connection with a rod 110, but the threads at opposite ends of the tubular part 106 are directed oppositely so that turning of the tubular part varies the effective length of the tie rod. The rod 110 may be connected to one of the wheel arms 11 as indicated at 112 and this pivotal connection may correspond to that shown by Fig. 8.

To the right of the rod 97 in Fig. 7, the latter has a threaded extension 115 which is adjustably connected to a tubular member 116 in substantially the same way as described in connection with the tubular member 106. Beyond the right end of the tubular member 116, the parts correspond to the parts at the left of the tubular member 116 and therefore need not be described. It should be mentioned, however, that the tubular member 116 may be clamped tightly to the threaded trunnions projecting into its ends, and that turning of the tubular member adjusts the effective length of the link extending between the arms 90 and 91.

A modified form of oscillatory connection is illustrated in Fig. 10. In this case, an arm 120 is provided with an opening 121 at one end which is formed from bifurcated parts and the opening may be reduced in diameter by means of a clamping bolt 122. Within the opening 121, rubber bushings 123 are provided which encircle internally threaded metal bushings 124. The latter are longitudinally split as indicated at 125 and grooves 126 are provided in the opposite sides of the bushings to render them more contractile. Flanges on the ends of the metal bushings and the rubber bushings serve to retain the rubber bushings in place. The metal bushings receive a threaded trunnion 127 on an arm 128 and the threaded bearing may be lubricated by means of a grease fitting 130 which communicates with a passage 131 leading to the bearing surface. It will be appreciated that this oscillatory connection will operate generally on the order of those described heretofore and that with the rubber constantly under compression, the metal bushing will be constantly contracted into engagement with the trunnion to compensate for wear and avoid looseness. Movement in different directions is permitted within limits by the resiliency of the rubber, as will be understood.

Although more than one form of the invention has been illustrated and described in detail, it will be apparent to those skilled in the art that various modifications may be made without departing from the spirit of the invention.

What is claimed is:

1. An oscillatory connection for automobiles comprising an inner threaded member, an outer member threaded on the inner member for pivotal threaded bearing engagement thereon, one of said members being slotted longitudinally of its axis, and separate means constantly and resiliently pressing against the slotted member to change its diameter so as to compenaste for thread wear or looseness.

2. An oscillatory connection for automobiles comprising an inner threaded member, an outer slotted member threaded on the inner member for pivotal threaded bearing movement thereon, and separate means constantly and resiliently pressing against the outer member to contract it about the inner member so as to compensate for thread wear or looseness.

3. An oscillatory connection for automobiles comprising an inner threaded member, an outer slotted member threaded on the inner member for pivotal threaded bearing movement thereon, and resilient rubber constantly and resiliently pressing against the outer member to contract it about the inner member so as to compensate for thread wear or looseness.

4. An oscillatory connection comprising an outer member having a socket, an inner member projecting into the socket and having a threaded portion, an internally threaded bushing in the socket and having pivotal threaded bearing engagement with the inner member, said bushing being slotted, and resilient rubber in the socket and around the bushing and acting to contract the bushing about the inner member so as to compensate for thread wear or looseness, the parts being so constructed and arranged that the rubber permits limited universal movement of the outer and inner members respectively.

5. An oscillatory connection for automobiles comprising an inner trunnion member, an outer generally cylindrical member mounted on the inner member for pivotal bearing movement thereon, said outer member being of one piece character and being slotted longitudinally so that it may be contracted about the trunnion member, and resilient rubber under compression around the outer member and acting to constantly contract it about the trunnion so as to compensate for wear or looseness.

6. An oscillatory connection for automobiles comprising a threaded trunnion, an internally threaded outer member having pivotal threaded bearing engagement with the trunnion, said outer member being of one-piece character and being slotted longitudinally so that it may be contracted about the trunnion, and resilient rubber under compression around the outer member and acting to constantly contract it about the trunnion so as to compensate for wear or looseness.

7. An oscillatory connection comprising an outer member having a socket, an inner member projecting into the socket and having a threaded portion, an internally threaded bushing in the socket and having pivotal threaded bearing engagement with the inner member, said bushing being of one-piece character and being slotted lonigtudinally so that it may be contracted about the trunnion, and resilient rubber under compression around the outer member and within the socket and acting to contract the bushing about the inner member so as to compensate for thread wear or looseness, the parts being so constructed and arranged that the rubber permits limited universal movement of the outer and inner members, respectively.

8. An oscillatory connection for automobiles comprising a threaded trunnion, an internally threaded bushing having pivotal threaded bearing engagement with the trunnion, said bushing being slotted longitudinally and being of one-piece character, with its outer surface frusto-spherical in shape, and resilient rubber under compression around the bushing and acting to contract it about the trunnion so as to compensate for wear or looseness.

9. An oscillatory connection for automobiles comprising a threaded trunnion, an internally threaded bushing having pivotal threaded bearing engagement with the trunnion, said bushing being slotted longitudinally and being of one-piece character with its outer surface frusto-spherical in shape, an outer socket member substantially frusto-spherical in shape and enclosing the bushing and trunnion, and resilient rubber under compression between the bushing and socket member and acting to contract the bushing about the trunnion so as to compensate for wear or looseness.

10. An oscillatory connection comprising a threaded trunnion, a one-piece internally threaded bushing having pivotal threaded bearing engagement with the trunnion, and resilient material under compression around the bushing, said bushing having its wall longitudinally split at one point and the wall diametrically opposite the split being longitudinally grooved with the depth of the groove less than the wall thickness.

11. In a steering gear, a pair of links, one having a threaded trunnion and the other comprising a two-part stamping having interlocking edges and forming a substantially spherical socket open at one side for receiving the trunnion, an internally threaded bushing on the trunnion and in the socket and having pivotal threaded bearing engagement with the trunnion, said bushing being of one-piece character and being longitudinally split at one point and also having a substantially frusto spherical exterior surface, and resilient rubber under compression between the interior surface of the socket and the external surface of the bushing.

12. In a steering gear, a connecting or link member comprising elongated stampings having their edges connected to form a unitary member, said stampings at one point being shaped to form a bearing socket, the stampings at one end of the member being shaped to provide a tubular portion with the longitudinal edges separated to allow for contraction of such portion, said portion being internally threaded, a link having a threaded end projecting into the tubular portion, an internally and externally threaded bushing threaded onto the end of the link and into the tubular portion, and clamping means for contracting the tubular portion about the bushing.

JOHN W. LEIGHTON.